(12) United States Patent
Rabinowitz

(10) Patent No.: US 7,410,108 B2
(45) Date of Patent: Aug. 12, 2008

(54) INTEGRAL DRIPPING EMITTER

(75) Inventor: Ishay Rabinowitz, Lehavim (IL)

(73) Assignee: NETAFIM Ltd., Tel Aviv (IL)

( * ) Notice: Subject to any disclaimer, the term of this patent is extended or adjusted under 35 U.S.C. 154(b) by 0 days.

(21) Appl. No.: 10/644,086

(22) Filed: Aug. 20, 2003

(65) Prior Publication Data

US 2005/0077396 A1 Apr. 14, 2005

(30) Foreign Application Priority Data

Aug. 22, 2002 (IL) .................................... 151446

(51) Int. Cl.
*B05B 15/00* (2006.01)
(52) U.S. Cl. ..................... 239/542; 239/547
(58) Field of Classification Search ......... 239/542–545, 239/589, 590, 547, 554
See application file for complete search history.

(56) References Cited

U.S. PATENT DOCUMENTS

| | | | |
|---|---|---|---|
| 3,833,176 A | 9/1974 | Caldwell | |
| 3,840,209 A | 10/1974 | James | |
| 3,899,136 A * | 8/1975 | Harmony | 239/533.13 |
| 3,934,824 A | 1/1976 | Fitzhugh | |
| 3,981,452 A | 9/1976 | Eckstein | |
| 4,043,360 A | 8/1977 | Yaron | |
| 4,143,820 A * | 3/1979 | Bright, Sr. | 239/108 |
| 4,226,368 A * | 10/1980 | Hunter | 239/542 |
| 4,411,292 A | 10/1983 | Schiller | |
| 4,573,640 A * | 3/1986 | Mehoudar | 239/542 |
| 4,715,543 A * | 12/1987 | Rinkewich | 239/542 |
| 4,756,339 A * | 7/1988 | Buluschek | 138/115 |
| 4,909,441 A * | 3/1990 | Christy | 239/109 |
| 5,111,995 A * | 5/1992 | Dumitrascu et al. | 239/542 |
| 5,156,680 A | 10/1992 | Orzechowski | |
| 5,271,786 A | 12/1993 | Gorney et al. | |
| 5,324,371 A | 6/1994 | Mehoudar | |
| 5,324,379 A | 6/1994 | Eckstein | |
| 5,330,107 A * | 7/1994 | Karathanos | 239/533.1 |
| 5,615,838 A * | 4/1997 | Eckstein et al. | 239/533.1 |
| 5,851,455 A | 12/1998 | Sehr et al. | |

FOREIGN PATENT DOCUMENTS

| | | |
|---|---|---|
| EP | 1 201 118 A1 | 5/2002 |
| GB | 1136993 | 12/1968 |
| WO | 89/09539 A1 | 10/1989 |
| WO | 95/13882 A1 | 5/1995 |
| WO | 00/30433 A1 | 6/2000 |

* cited by examiner

*Primary Examiner*—Davis D Hwu
(74) *Attorney, Agent, or Firm*—Nath Law Group; Jerald L. Meyer; Matthew J. Moffa

(57) ABSTRACT

An extruded irrigation pipe connectable to a pressurized fluid source via a first end of the pipe, the pipe comprising drip-irrigation plug emitter mounted integrally therein during the extrusion process of the pipe. The plug emitter has an inlet in fluid communication with the first end of the pipe, a drip outlet in fluid communication with a second end of the pipe, and a flow-restricting path therebetween. The emitter plugs the pipe with respect to any fluid flow except for the flow through the flow-restricting path. The pipe is conveniently produced as a section of a continuous long pipe comprising a plurality of such sections and adapted for being cut into such sections.

17 Claims, 3 Drawing Sheets

INTEGRAL DRIPPING EMITTER

FIELD OF THE INVENTION

This invention relates to emitters in drip irrigation pipelines, in particular to end or plug emitters and methods of producing the same.

BACKGROUND OF THE INVENTION

In the art of drip irrigation there are known end or plug emitters that are disposed at the outlet ends of branch irrigation pipes. They constitute plugs with some sort of pressure-reducing device providing slow trickling or dripping of water through the outlet end of the branch pipe. The branch pipe is connected by its other end to a main line supplying water under pressure.

GB 1,136,993, U.S. Pat. Nos. 3,833,176 and 3,840,209 disclose branch pipes made of resilient material with a threaded screw inserted in the outlet end of the pipe. The threads of the screw cut into the resilient walls of the branch pipe forming a restricted helical passage between the threads and the wall. The passage has great hydraulic resistance to the passing flow and thereby constitutes a pressure-reduction device. The rate of dripping may be regulated by drawing the screw deeper into the pipe or by withdrawing it.

U.S. Pat. No. 3,934,824 discloses an end emitter constituting a collapsible tube with a plurality of crimps or folds providing a sinuous path to the emitted water. The pressure reduction function of a particular end emitter is regulated by cutting off a part of the crimps.

U.S. Pat. No. 4,043,360 discloses a pressure reducing device suitable for use as an end dripper. The device has an inner cylindrical body with a plurality of transverse grooves interconnected in axial direction so as to form a tortuous flow labyrinth with the walls of a pipe where the cylindrical body is inserted.

In all the above examples, the emitters are designed for insertion in the pipe only through the end thereof.

SUMMARY OF THE INVENTION

In accordance with the present invention, there is provided an extruded pipe connectable to a pressurized fluid source via a first end, the pipe comprising drip-irrigation internal plug emitter mounted integrally therein during the extrusion process of the pipe. The plug emitter has an inlet in fluid communication with the first end of the pipe, a drip outlet in fluid communication with a second end of the pipe, and a flow-restricting path therebetween. The emitter stops any flow through the pipe except for the flow through the flow-restricting path. The extruded pipe constitutes a section of a continuous long pipe comprising a plurality of such sections and adapted for being cut into such sections. The plug emitter may form a swelling at the outer surface of the pipe.

The flow-restricting path is preferably formed as a flow labyrinth defined between a labyrinth channel in the peripheral surface of the plug emitter and an adjacent wall of the pipe.

The extruded pipe may have an additional plug emitter near the original one, thereby allowing to adjust the length of the flow-restricting path by cutting off the distal emitter. For the same purpose, the pipe and the plug emitter may be adapted to be cut together.

The extruded pipe may be provided with a means for fixing its second end in suitable position relative to an irrigated plant. In this case a portion of the pipe between its second end and the drip outlet of the plug emitter may accommodate the fixing means in the form of a peg with one end tightly insertable into said portion of the pipe and a pointed second end adapted to sink in the soil. The peg may have a conduit providing fluid communication between the drip outlet and an exit disposed on peg's surface between the pipe's second end and the pointed end of the peg. Alternatively, the peg may provide a passage between the peg's surface and the internal surface of the pipe allowing a drip flow exiting from the drip outlet to leave the pipe through its second end.

According to another aspect of the present invention, there is provided a drip-irrigation plug emitter for mounting inside an extruded pipe as described above. The plug emitter may have a filter disposed upstream of the flow labyrinth. Preferably, the flow labyrinth is symmetric relative to the direction of flow therethrough to an extent that the flow inlet of the plug emitter may be used as a drip outlet and vice versa. The symmetric plug emitter may have two filters disposed at either end of the flow labyrinth.

According to a third aspect of the present invention, there is provided a method for extrusion of a continuous long pipe comprised of sections each constituting the extruded pipe described above, the method including inserting said plug emitters at predetermined intervals, during the extrusion of the pipe, so that each emitter would plug the pipe with respect to any fluid flow except for the flow path through the emitter. The method may further include cutting the long pipe into pipe sections, for example so that each section will have an end adjacent to the drip outlet of the emitter.

A network of drip irrigation lines comprising main lines and branching pipes with end emitters can be assembled in a very quick and labor-saving manner from the extruded pipes with integral plug emitters of the present invention, since the branch pipes will be manufactured with emitters in place. The individual dripping rate of each branch can be adjusted by providing more than one emitter in each pipe section and cutting off the additional emitters or a portion of the flow labyrinth together with the pipe, as needed. The pipes with plug emitters can be extruded without interruption by well-known efficient industrial methods in long continuous reels. The long pipe may be cut into sections in the moment of production or after delivery to the premises of the user.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 1:
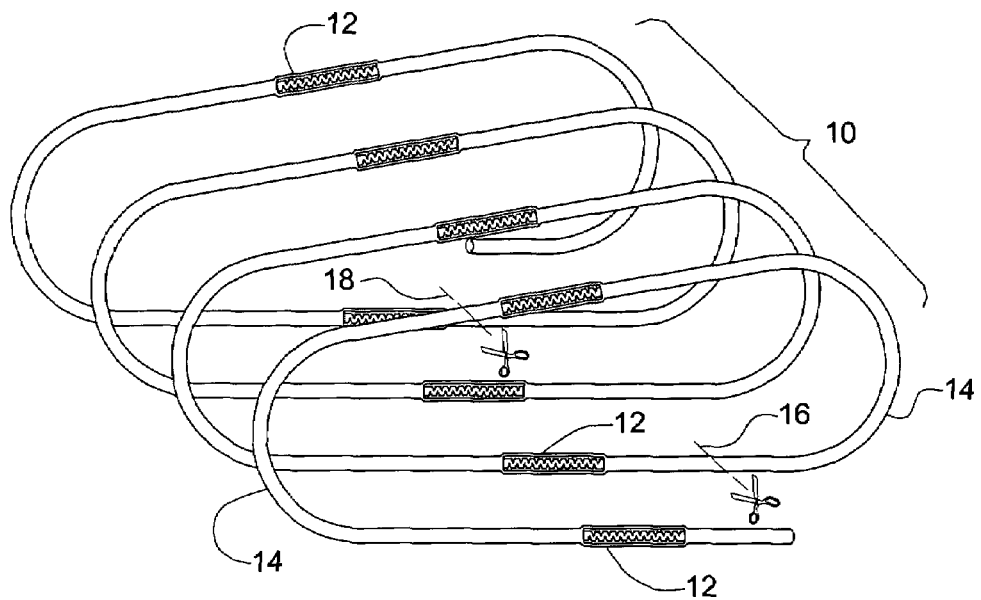
FIG. 1 is an extruded pipe with an internal plug emitter as a cut-off section of a long continuous reel.

With reference to FIG. 1, there is shown a reel 10 of long continuous extruded pipe with drip-irrigation internal plug emitters 12 mounted integrally during the extrusion process of the pipe. The reel is cut into sections 14, for example in positions 16 and 18, which may be done in the process of production or after the long reel is delivered to the irrigation site, as suitable. The pipe around a plug emitter may be flush with the rest of the pipe, for example pipe 34, but is preferably formed with a swelling on the outer surface, for example pipe 14. A visible swelling contributes to more accurate cutting at the site. The swelling may be necessary for a narrow pipe to accommodate a larger emitter, for example with more developed flow labyrinth.

Figure 2:
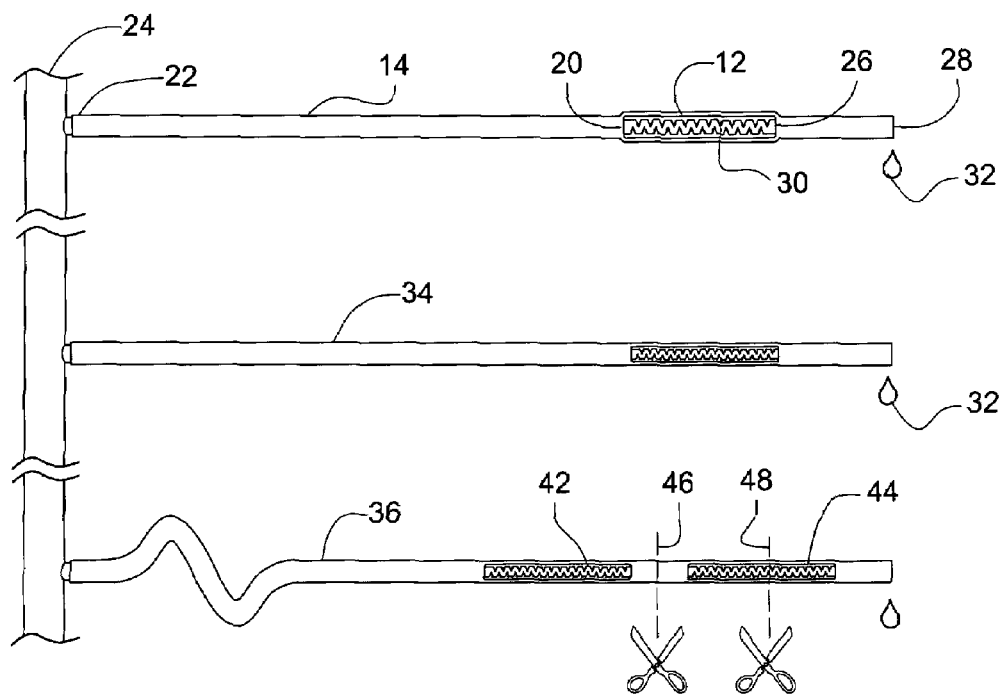
FIG. 2 shows three design variations of the extruded pipe of FIG. 1 connected to a main water line.

With reference also to FIG. 2, each extruded pipe section, such as section 14, comprises an emitter 12. The plug emitter 12 has an inlet 20 in fluid communication with a first (proximal) end 22 of the pipe 14 connectable to a pressurized source of water, such as a water supply line 24, a drip outlet 26 in fluid communication with a second (distal) end 28 of the pipe, and a flow-restricting path 30 between the inlet 20 and the outlet 26. The emitter 12 entirely closes the cross-section of the pipe so that water can flow through the pipe only by way of the flow-restricting path 30. Thereby water passing through the extruded pipe 14 would exit from the distal end 28 under low pressure, in drops 32.

A plurality of extruded pipe sections such as 14, 34 and 36 are assembled in branching irrigation network 40 by connecting to the water supply line 24. The assembly is labor saving and is facilitated by the fact that the plug drip emitters are already reliably integrated in the pipes in the process of production.

As shown in FIG. 2, the extruded pipe section 36 may comprise an additional proximal plug emitter 42 near the distal emitter 44, thereby allowing to adjust the length of the flow-restricting path by cutting off the distal emitter 44, as shown in position 46. The emitter 44 may be made of suitable material to enable cutting it together with the pipe for the same purpose, as shown in position 48.

Figure 3:
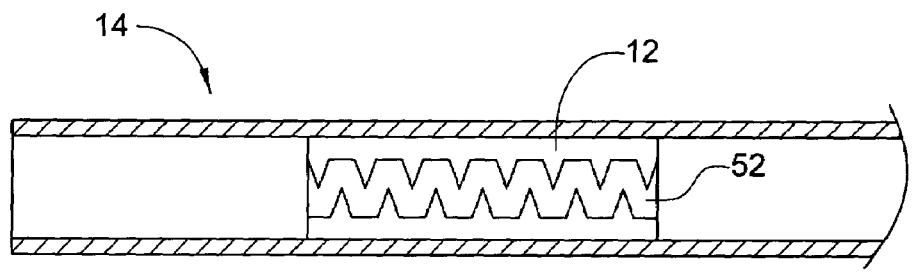
FIG. 3 is an enlarged sectional view of a symmetric plug emitter with labyrinth, mounted in the extruded pipe of FIG. 1.
Figure 3:
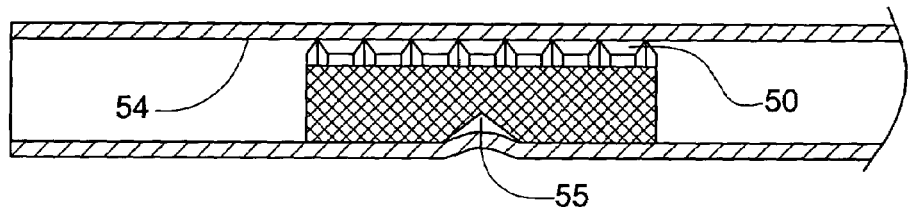
Figure 4:
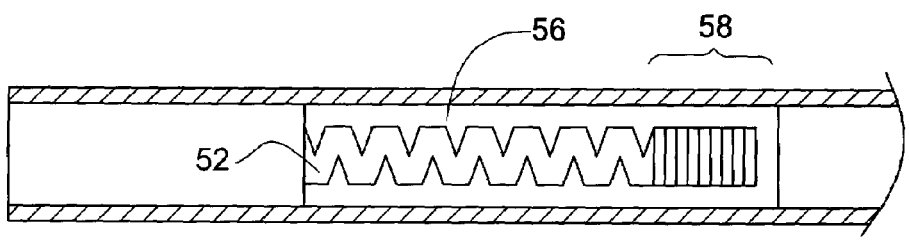
FIG. 4 is an enlarged sectional view of a plug emitter with a labyrinth and a filter, mounted in the extruded pipe of FIG. 1.
Figure 4:
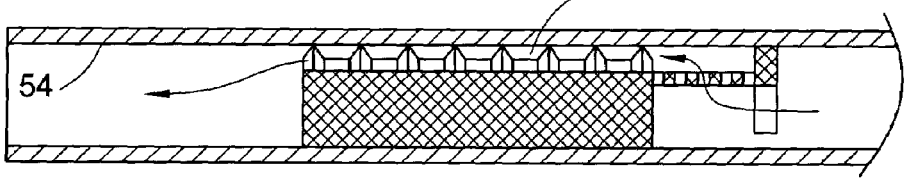
Figure 5:
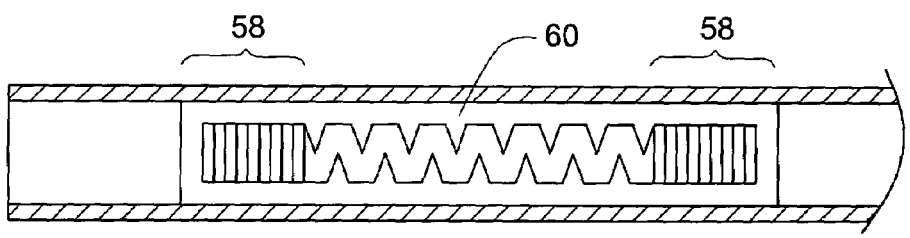
FIG. 5 is an enlarged sectional view of a symmetric plug emitter with a labyrinth and two filters, mounted in the extruded pipe of FIG. 1.
Figure 5:
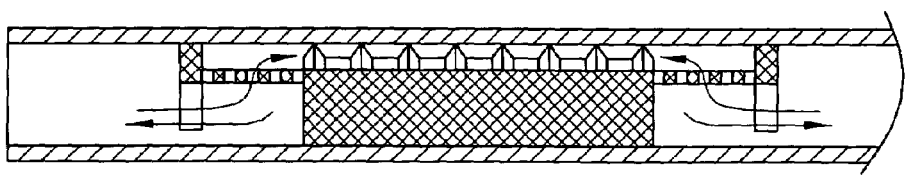

With reference to FIGS. 3, 4 and 5, the flow-restricting path 30 of the plug emitter 12 is preferably in the form of a flow labyrinth 50 defined between a labyrinth channel 52 in the peripheral surface of the plug emitter and an adjacent wall 54 of the pipe 14. The plug emitter 12 occupies the whole cross-section of the pipe 14 leaving a passage for the flow only via the flow labyrinth 50. As shown in FIG. 4, a plug emitter 56 may have a filter 58 disposed upstream of the flow labyrinth 50. Preferably, the plug emitter with the flow labyrinth is symmetric relative to the direction of flow to an extent that the flow inlet of the plug emitter may be used as a drip outlet and vice versa, as the emitter 12 shown in FIG. 3. The symmetric plug emitter 60 may have two filters 58 disposed at either end of the flow labyrinth, as shown in FIG. 5. Symmetric emitters are easier to install in the pipe during the extrusion process. The body of the emitter may have notches 55 to facilitate cutting a portion thereof, as explained above.

Figure 6:
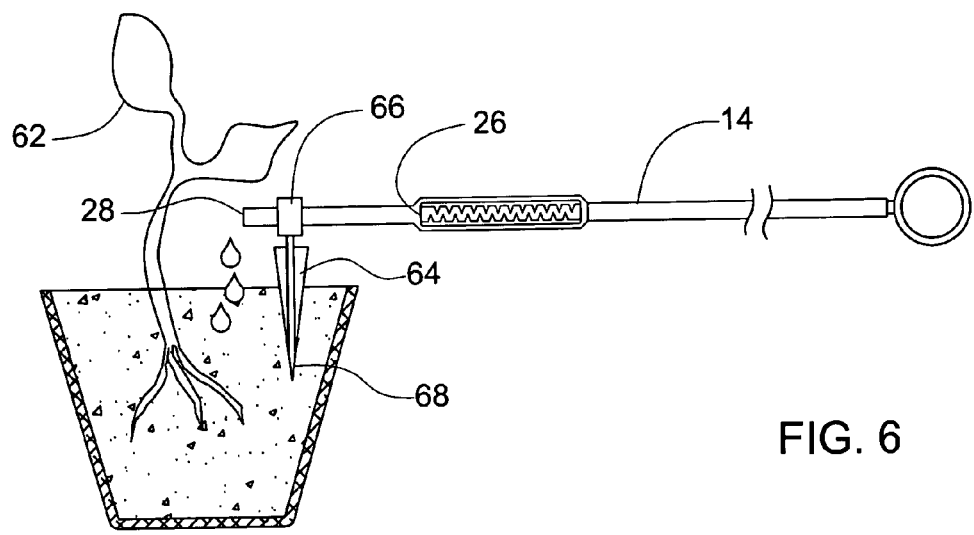
FIG. 6 is a schematic view of a pipe's dripping end fixed near a plant by means of a peg with external brace.
Figure 7:
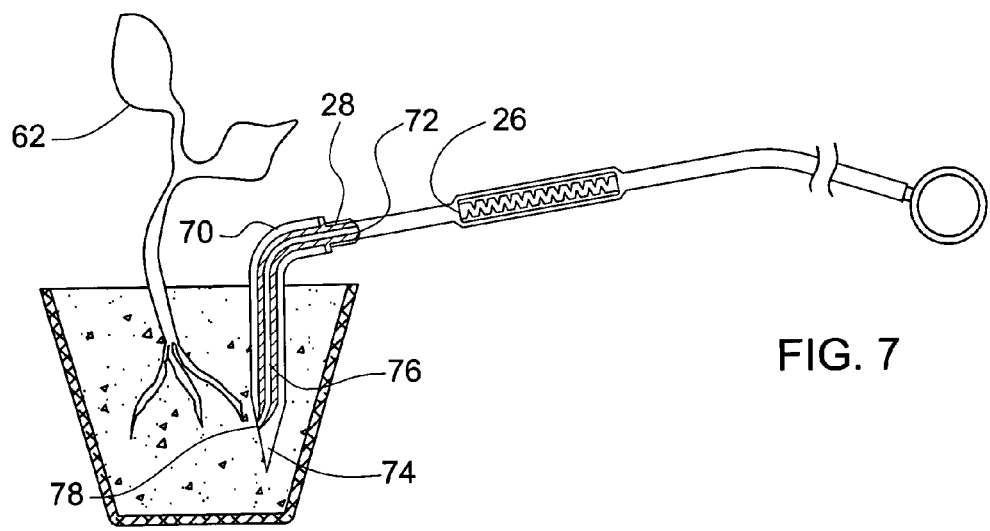
FIG. 7 is a schematic view of a pipe's dripping end fixed near a plant by means of a peg with channel and internal plug.
Figure 8:
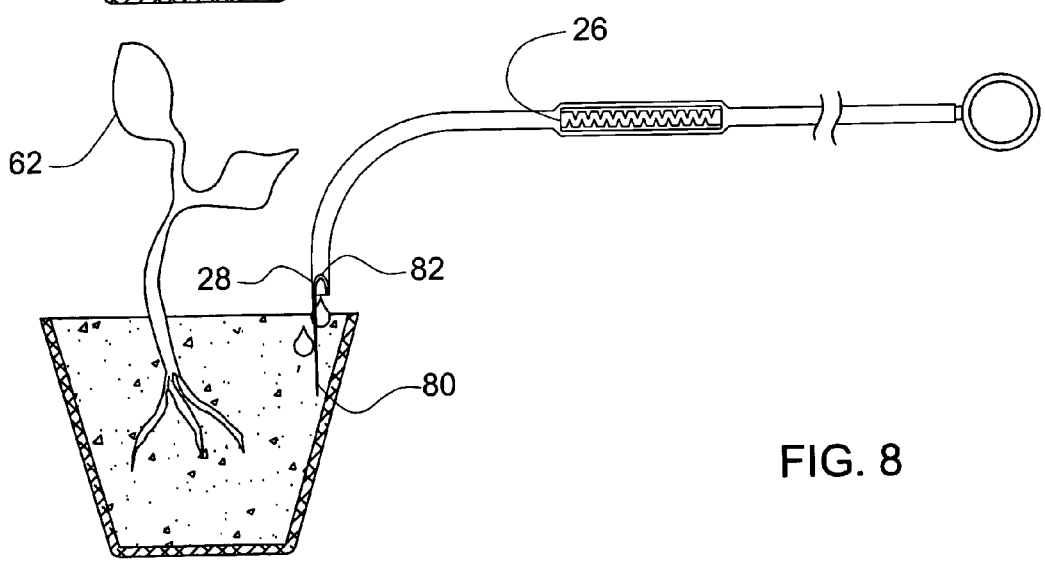
FIG. 8 is a schematic view of a pipe's dripping end fixed near a plant by means of a spike with a hook inserted in the pipe.

With reference to FIGS. 6, 7 and 8, the extruded pipe 14 may be provided with a means for fixing the distal end 28 in suitable position relative to an irrigated plant 62. Such means may be a peg 64 with a brace or clamp 66 and blade 68 as shown in FIG. 6. The brace holds the end 28 while the blade is sunk in the soil near the plant. A portion of the pipe 14 between the distal end 28 and the drip outlet 26 may be used to accommodate another fixing means in the form of a peg 70. The peg 70 has one end 72 tightly insertable into the end 28 of the pipe, and a pointed second end 74 adapted to sink in the soil. The peg 70 has a conduit 76 providing fluid communication between the drip outlet 26 and an exit 78 on peg's surface. The exit 78 may be disposed anywhere on the peg outside the pipe. As shown in FIG. 8, the peg may be in the form of a spike or a needle 80 having an eye 82 tightly sitting in the distal end 28 of the pipe but allowing a drip flow exiting from the drip outlet 26 to leave the pipe through the distal end.

The extruded pipes of the present invention are easily produced by known methods for extrusion of continuous long pipes with bypass emitters. Such method is for example disclosed in U.S. Pat. No. 3,981,452, included herein by reference, without the step of making an aperture in the pipe. The plug emitters of the present invention are inserted during the extrusion at predetermined intervals so that each emitter would stop the pipe allowing only a flow through the flow labyrinth. The method may optionally include cutting the long pipe into extruded pipe sections.

Although a description of specific embodiments has been presented, it is contemplated that various changes could be made without deviating from the scope of the present invention. For example, the flow restricting means may be in the form of a narrow opening, the labyrinth flow path may be formed entirely in the body of the plug emitter, the plug emitter may be assembled from two or more parts, etc.

The invention claimed is:

1. An extruded pipe connectable to a pressurized fluid source via a first end of said pipe, the pipe comprising a second open end, and a drip-irrigation plug emitter whose circumferential extremity is in full contact with an inner circumference of the pipe, the second open end of the pipe being away from the emitter, the emitter being mounted entirely within the pipe during the extrusion process of the pipe, said emitter having an inlet in fluid communication with said first end of the pipe, a flow restricting path connected to the inlet, and a drip outlet connected to the flow restring path and directing fluid from the flow restricting path to the second open end of the pipe away from the emitter, said emitter plugging the pipe with respect to any fluid flow except for the flow through said flow-restricting path, wherein all fluid flowing through the pipe has to flow through the emitter and wherein all fluid which exits the pipe exits from the second open end of the pipe, the pipe having at least one additional plug emitter allowing to adjust the length of said flow-restricting path by cutting off the plug emitter which is closer to said second open end.

2. An extruded pipe according to claim 1, constituting a plugged section of a continuous long pipe comprising a plurality of such sections, said extruded pipe resulting from cutting said continuous long pipe.

3. An extruded pipe according to claim 1, wherein said plug emitter forms a swelling at the outer surface of the pipe.

4. An extruded pipe according to claim 1, wherein said pipe and said plug emitter are adapted to be cut together, thereby allowing to adjust the length of said flow-restricting path.

5. An extruded pipe according to claim 1, wherein said flow-restricting path is formed as a flow labyrinth.

6. An extruded pipe according to claim 5, wherein said plug emitter has peripheral surface formed with a labyrinth channel, and said flow labyrinth is defined, at least in part, by said labyrinth channel and an adjacent wall of said pipe.

7. An integral drip-irrigation plug emitter adapted for mounting inside an extruded pipe according to claim 1.

8. A drip-irrigation plug emitter according to claim 7, further having a filter means disposed upstream of said flow labyrinth.

9. A drip-irrigation plug emitter according to claim 7, wherein said flow labyrinth is symmetric relative to the direction of flow therethrough to an extent that the flow inlet may be used as a drip outlet and vice versa.

10. A drip-irrigation plug emitter according to claim 9, further having two integral filter means disposed each at one end of said flow labyrinth.

11. A drip-irrigation plug emitter according to claim 7, wherein said plug emitter has peripheral surface formed with a labyrinth channel, and said flow-restricting path is defined, at least in part, by said labyrinth channel and an adjacent wall of said pipe.

12. A method for extrusion of a continuous long pipe comprised of sections constituting the extruded pipe of claim 1, wherein said method includes inserting said plug emitters at predetermined intervals during the extrusion process so that said pipe is plugged by each emitter with respect to any fluid flow except for the flow path through the emitter.

13. A method according to claim 12, further including cutting said long pipe into said sections.

14. A method according to claim 13, wherein each said section has an end adjacent to the drip outlet of said emitter.

15. An extruded pipe according to claim 1, further having a means for fixing said second end of the pipe in suitable position relative to an irrigated plant.

16. An extruded pipe according to claim 15, having a portion of the pipe between said second end and said drip outlet adapted to accommodate said fixing means inside said portion.

17. An extruded pipe according to claim 16, wherein said fixing means is an elongated body with one end tightly insertable into said portion of the pipe and a pointed second end adapted to sink in the soil.

* * * * *